United States Patent Office.

ALFRED B. ELY, OF NEWTON, MASSACHUSETTS.

Letters Patent No. 72,727, dated December 31, 1867.

IMPROVEMENTS IN BOOTS AND SHOES.

*The Schedule referred to in these Letters Patent and making part of the same.*

TO WHOM IT MAY CONCERN:

Be it known that I, ALFRED B. ELY, of Newton, in the State of Massachusetts, have invented a new and useful Counter and Stiffener for the Heels of Boots and Shoes, or mode of manufacturing the same; and that the following is a full and exact description thereof.

Heel-stiffenings and counters have been made of leather, of metal, and of rubber, compounded and vulcanized, and also of rubber and fibrous materials ground up and mixed together, and compounded and vulcanized.

My invention consists in making them of a composition of hard resin or resinous substances, or other suitable substances, other than rubber and fibrous material, formed and moulded by heat and pressure, and also in making them of felted and woven fabrics, saturated and coated with any suitable substance which will impart to the article, when shaped by heat and pressure, the proper hardness and elasticity.

The resin and fibre may be mixed in any suitable proportion, according to the kind and quality of the materials used, to give the compound or article the proper tenacity and hardness, and, while warm, spread, or rolled, or ground between rolls, into sheets, and cut into proper sizes, and pressed into shape in heated moulds. The fibre and resin may be ground together, or otherwise mixed, as found convenient. The fibrous material may be used in the form of a textile or woven fabric, (as canvas,) and this, thoroughly saturated, or saturated and coated with the resin, or resinous gum, either pure or mixed with fibre, cut into proper pieces, and shaped in heated moulds by proper pressure. The degree of heat is to be regulated by the kind of article wanted for use. In some cases it may answer to be warmed or heated, and then pressed in moulds of the required shape, but where wanted in the form of complete stiffeners, it is better to press them in heated moulds. For counters only they, as they are called, pieces may be cut of the required form, and shaped to the boot or shoe when used by the manufacturer.

Felted and woven fabrics may be used when saturated, or saturated and coated with any suitable substance, so that the article, when properly heated and pressed, or pressed under heat, as in heated moulds, will assume the proper shape, and possess or acquire the proper hardness and elasticity.

A patent has heretofore been granted to me for saturating fibrous articles with a mixture of rubber and paraffine, and this mixture may be found useful for the purpose.

What I claim in the manufacture of counters and heel-stiffeners, is—

The use of resinous bodies combined with fibrous materials, substantially as described.

I also claim a heel-stiffener, made of the above-described substances, and formed into shape by means of heat and pressure, substantially as set forth.

I also claim a heel-stiffener, made of felted or woven fabric, saturated with resinous material, so that the article, when shaped under heat and pressure, shall possess the proper hardness and elasticity, substantially as described.

ALFRED B. ELY.

Witnesses:
A. GOODELL,
C. H. JOHNSON.